United States Patent Office 2,800,108
Patented July 23, 1957

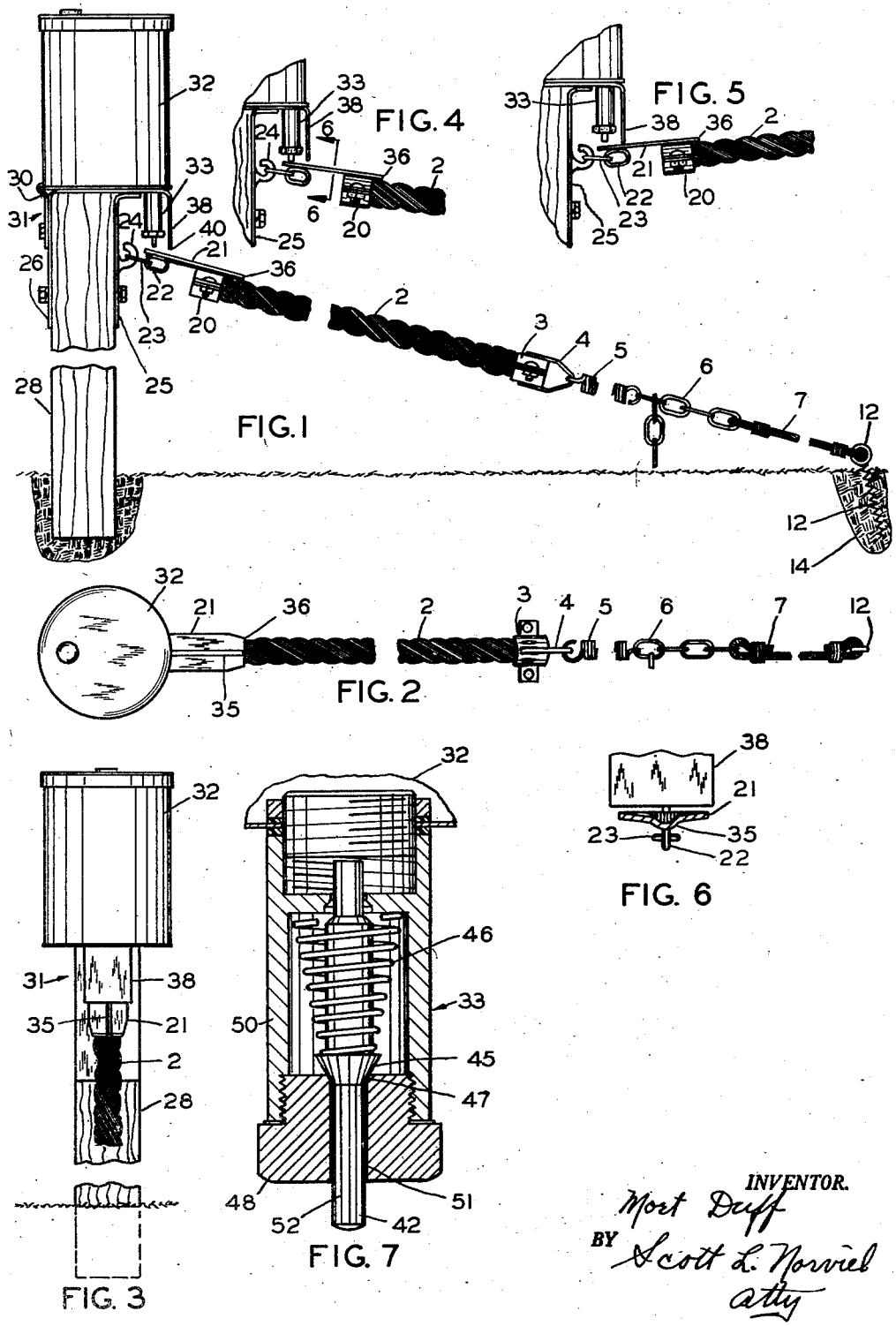

2,800,108

ANIMAL SCRATCHERS AND MEDICATORS

Mort Duff, Phoenix, Ariz.

Application May 7, 1956, Serial No. 583,262

3 Claims. (Cl. 119—157)

This invention concerns hide scratchers, oilers and medicators for cattle and other domestic animals.

One of the objects of the invention is to provide a scratcher and oiler which has a strong durable oiling and medicating element consisting principally of a marine rope of large diameter supported at one end by apparatus combined with an oil container which will maintain the rope in a condition covered with or impregnated with oil which may contain medicating substances.

Another object of the invention is to provide a scratcher and oiler for animals, as above mentioned wherein a simple, durable and effective mechanism is provided which will supply a predetermined amount of oil to an upwardly slanting rope scratching element; the oil dispersing mechanism being arranged so that an excessive amount of oil will not be supplied to the rope in case the rope is violently agitated by an animal.

Another object is to provide a valve for distributing oil by gravity from a container to a scratching rope which is supported beneath it, in predetermined amounts when actuated by movement of the rope imparted by an animal scratching against it, but will not supply an excessive amount in case of long continued scratching by the animal or agitation of the scratching element otherwise than by an animal; the parts being arranged so that excessive pressure against the scratching element will not cause excessive flow of the oil such as would waste oil or cause excessive impregnation of the oil into the body of the rope scratcher.

Other objects will appear hereinafter.

I attain the foregoing objects by means of the parts, devices, and particular construction, and combinations of parts as shown in the accompanying drawing wherein—

Figure 1 is a side elevational view of a scratching and hide oiling device incorporating my improvements;

Figure 2 is a plan view thereof;

Figure 3 is an end elevational view of the device as shown in Figure 1;

Figure 4 is a side elevational view of the valve and its operating parts when the valve is in open position;

Figure 5 is a side elevational view of the device and operating parts when the scratching element is raised an excessive amount by an animal, and showing particularly how the valve closes when excessive lifting movement is applied to the scratching element;

Figure 6 is a sectional view of the oil catching plate taken substantially on line 6—6 of Figure 4, and drawn on a somewhat enlarged scale; and Figure 7 is a mid-sectional elevation of a valve used in conjunction with the other parts of the scratcher for releasing oil from a container.

Similar numerals refer to similar parts in the several views.

Referring to the drawings, numeral 2 indicates a scratching element composed of a length of large diameter marine rope. The lower end of this rope is attached by a collar 3 having a bale 4, to a tensioning spring 5. This tensioning spring is hooked, at its lower end, to a chain 6 wherein the links may be used selectively for easy adjustment for the length and tension to be applied to the scratching element. At the lower end of the chain there is a steel cable 7 which, at its outer end, is attached to the eye of an earth auger 12, secured in the ground at 14. The upper end of the scratching element 2 is secured by a collar clamp 20, which is attached to an oil catching plate 21. On the under side of plate 21 and near its upper end a chain link 22 is welded. A cross link 23 is inserted through link 22 and forms a means for easy attachment to a hook 24, which is welded to a plate 25.

Plate 25 and oppositely positioned plate 26 form a means for attaching base 30 of a frame 31 to post 28.

Supply tank 32 has a bottom resting on base 3 in which there is a valve 33 used for dispersing oil from the tank and distributing it onto the upper face of plate 21. It is to be noted that there is a groove 35 pressed into the face of plate 21 to collect any oil that drops onto it and to direct it downwardly toward the lower end or lip 36 of the plate. This point of dispersal is directly above the upper surface of the scratching element 2 so that any oil dripping from the lip of the groove drops onto the surface of the scratching element.

On frame 31 and depending from its top face there is a fulcrum plate or stop element 38. This consists of a width of plate material positioned so that its lower end edge 40 is disposed above the upper face of the upper end portion of plate 21, and somewhat below the upper end of said plate. This plate 38 acts as a shield for valve 33 and its lower end edge acts as a contacting fulcrum to prevent excessive contact of the upper face of plate 21 with the valve pin 42 which is at the lower end of valve 33.

The construction of valve 33 is not, per se, novel but is adapted for particular use in this device. The valve consists of a plug 45 held downward in closed position on seat 47 by a spring 46. An opening stem 42 continues downward below the valve portion 45, and outward through a hole 51 in plug 48 which closes the lower end of valve case 50. The stem 42 fits somewhat loosely in hole 51 in plug 48 and may be otherwise provided with flutes 52 for the downward flow of oil released by valve plug 45. The valve body 50 is screwed onto any suitable tubular fitting (not shown) attached to the bottom of tank 32.

The frame 31 is attached to post 28 so that hook 24 is elevated about four feet from the ground. This maintains the rope scratching element at a slant so that oil will flow down its full length from the upper end near collar 20.

The slant of element 2 makes it attractive as a scratcher for cattle, as well as other animals. If the animal reaches under element 2 or otherwise raises it the top face of plate 21 contacts the lower end of stem 42 and raises it. This lifts the valve plug 45 from seat 47 and releases a small amount of oil which flows down stem 42 and drips onto plate 21, then flows into groove 35 and drips off lip 36 onto the upper face of element 2. The oil then flows down the element, as above mentioned.

This action of the plate and valve stem is termed the primary opening movement and is illustrated in Figure 4.

Should the animal raise the element higher than the condition shown in Figure 4, the upper face of plate 21 contacts the lower edge of fulcrum plate 38, as shown in Figure 5. As the outer portion of plate 21 tilts up, the inner end portion tilts down and away from the lower end of valve stem 42 and the valve closes. Thus no oil is wasted by violent or excessive agitation of element 2. Side motion of this element opens valve 33 only when the parts attain the position shown in Figure 4. Downward pressure on element 2 has no effect on the valve stem. Opening of the valve only on temporary moderate upward movement, however, is sufficient to keep element 2 well oiled.

The arrangement of the plate 21, fulcrum plate 38, hook 24 and the resilient slanting suspension of element 2 by spring 5 and the parts connecting to earth screw 12 provide a sturdy, cheap and dependable means for metering a predetermined amount of oil from tank 32 and applying it to rope element 2.

I claim:

1. An animal scratcher and medicator including an elevating post, a frame mounted on said post having a flat top, a tank for holding medicated oil mounted on said frame top, a valve in the bottom of said tank having a normally resiliently closed valve with a depending stem adapted to open said valve by upward motion, a scratching element attached to said frame and extending outwardly and downwardly therefrom and held taut by a spring means at its bottom end; said end being attached by a stake to the ground; a collar attached to the upper end of said scratching element having an oil catching plate on its upper side, a fulcrum plate attached to and depending from the top of said frame deposed outward from said valve and having a lower edge adapted to contact said oil catching plate when it is raised by the upward movement of said scratching element; said fulcrum plate being disposed to cause said oil catching plate to tilt downward when said scratching element is raised so that its upper end does not contact the valve stem of said valve in the bottom of said tank.

2. An animal scratcher and medicator composed of an elevating post set in the ground, a frame mounted on the upper end of said post having a flat top, a tank for holding medicated oil mounted on the top of said frame, a valve in the bottom of said tank having a normally resiliently closed valve plug with a depending stem extending downwardly therefrom and adapted to be opened by upward motion of said valve stem to release oil from said tank around said stem, a scratching element attached to said frame and extending at an angle outwardly and downwardly therefrom, spring means attached to the lower end of said scratching element at one end and staked to the ground at the other end, holding said scratching element resiliently taut, a collar attached to the upper end of said scratching element having an oil catching plate on its upper side adapted to receive oil released from said valve and direct it onto the upper end of said element, an oil valve guard and fulcrum plate attached to the frame top and depending therefrom substantially over said scratching element having its lower edge adapted to contact said oil catching plate and act as a fulcrum therefor; said oil catching plate and said fulcrum edge being disposed so that predetermined upward motion of said scratching element will move said oil catching plate to contact said valve stem and open it to release oil, and motion beyond said predetermined amount will contact said fulcrum and cause said oil catching plate to move out of contact with said valve stem.

3. In an animal scratcher and medicator including a tank mounted on a post, and a downwardly slanting scratching element extending from said post beneath said tank, means for applying medicated fluid from said tank to said scratching element composed of a valve in the bottom of said tank having a depending valve stem adapted to open by upward movement, a valve guard plate extending downward parallel to said valve and having a lower edge adapted to act as a fulcrum, and an oil catching plate on the upper end of said scratching element disposed beneath said valve and valve guard plate and adapted to direct oil falling on its upper face onto said scratching element; said oil catching plate being positioned so that a predetermined upward movement of said scratching element will bring it in opening relation contact with said valve stem, and upward movement beyond said predetermined degree will cause said catching plate to fulcrum on the lower edge of said valve guard plate and not contact said valve stem.

References Cited in the file of this patent

UNITED STATES PATENTS

| | | |
|---|---|---|
| 2,663,284 | Stonesifer | Dec. 22, 1953 |
| 2,669,968 | Rasmussen | Feb. 23, 1954 |
| 2,706,465 | Caldwell | Apr. 19, 1955 |
| 2,766,726 | Duff | Oct. 16, 1956 |